Sept. 9, 1941.  L. T. BAKER  2,255,145
MEANS FOR DISTILLING TURPENTINE GUM
Filed July 12, 1939  2 Sheets-Sheet 1
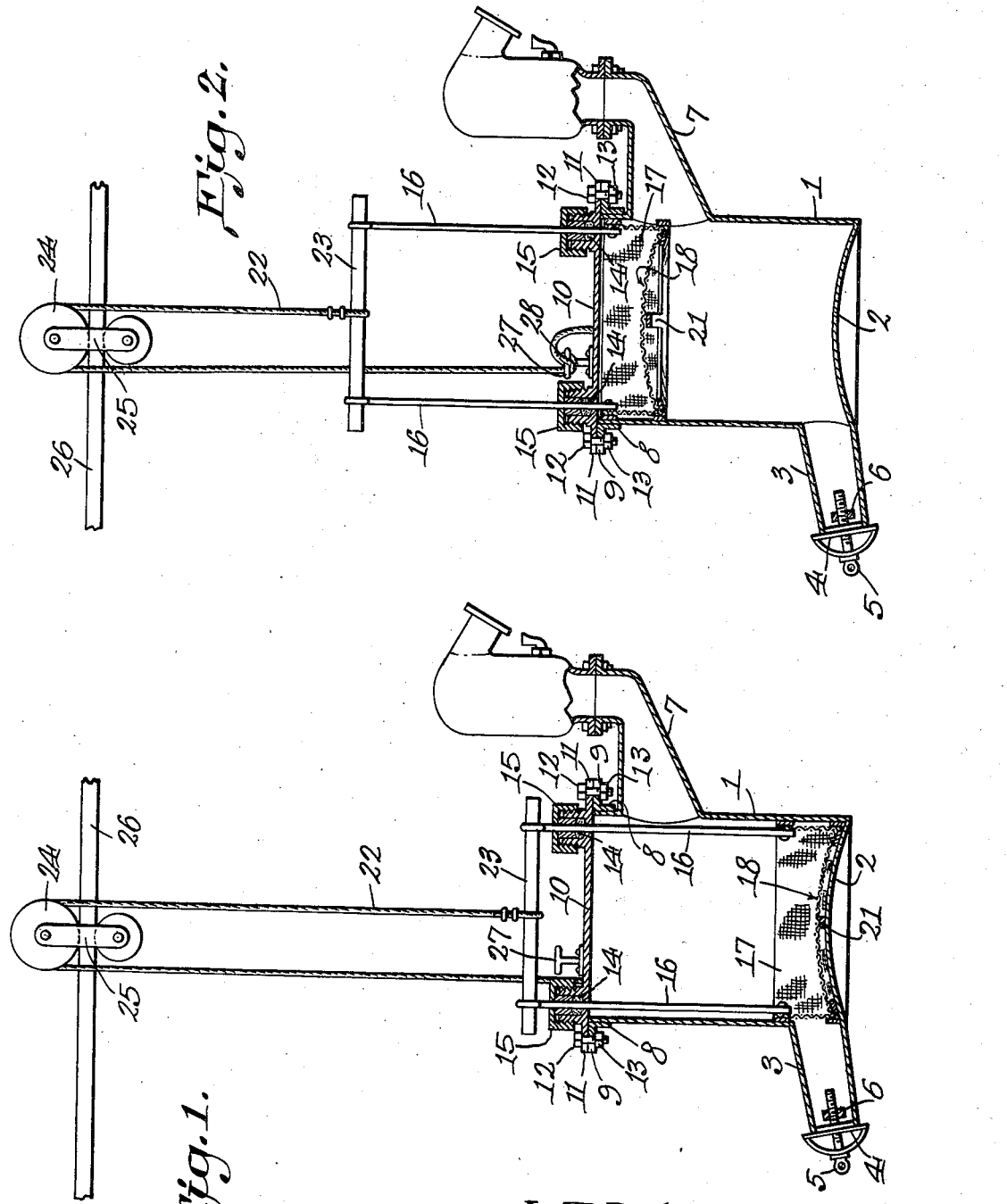
L.T.Baker INVENTOR.
BY CASnow&Co.
ATTORNEYS.

Sept. 9, 1941.   L. T. BAKER   2,255,145
MEANS FOR DISTILLING TURPENTINE GUM
Filed July 12, 1939   2 Sheets-Sheet 2
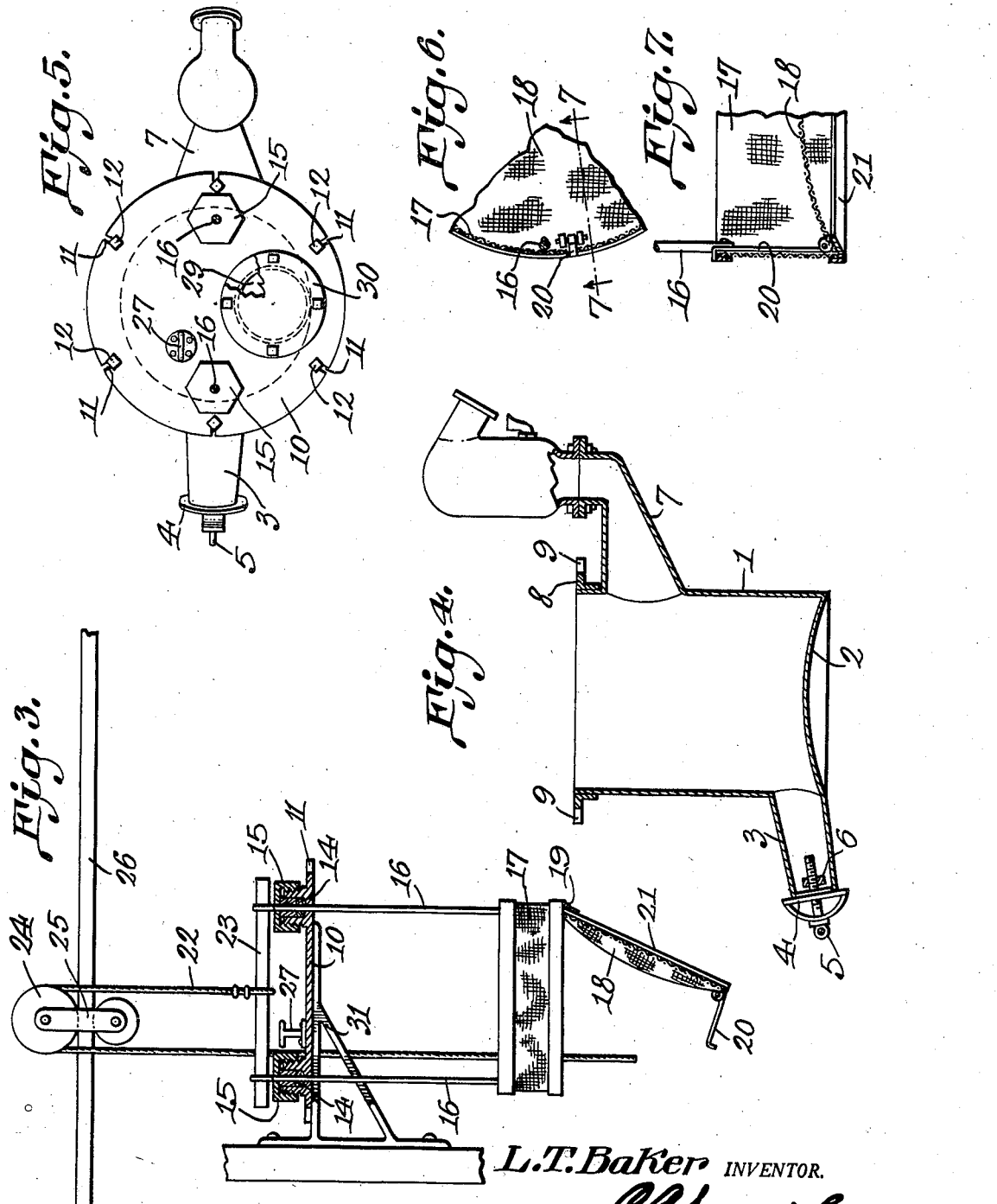
L.T.Baker INVENTOR.
BY
ATTORNEYS.

Patented Sept. 9, 1941

2,255,145

UNITED STATES PATENT OFFICE 2,255,145

MEANS FOR DISTILLING TURPENTINE GUM

Lewis T. Baker, Jacksonville, Fla.

Application July 12, 1939, Serial No. 284,069

6 Claims. (Cl. 202—266)

This invention relates to means for distilling turpentine gum and it is designed primarily to produce rosin free from discoloration due to the retention of foreign substances therein during the distilling process.

It is a further object to remove foreign substances from the gum as soon as it is melted and without opening the still with consequent loss of fumes.

A still further object is to maintain all foreign matter within the still but above the level of the melted heated gum during the distilling process whereby any rosin or other substances to be reclaimed can be collected from the foreign matter even though the foreign substances are withdrawn from the gum so that they will not discolor the rosin during the distilling process.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings:

Figure 1 is a vertical section through a still having the present improvements and showing the positions of the parts after the gum has been placed in the still and the still closed prior to the starting of the distilling operation.

Figure 2 is a similar view showing the basket elevated following the melting of the gum, thereby to separate foreign substances from the rosin.

Figure 3 is a side elevation of the basket after it has been taken from the still for the purpose of removing the foreign substances following the completion of the distilling operation, the top of the still being shown in section.

Figure 4 is a section through the still with the top and basket removed.

Figure 5 is a plan view of the still, a part being broken away.

Figure 6 is a plan view of a portion of the basket.

Figure 7 is a vertical section through a portion of the basket taken on the line 7—7, Figure 6.

Referring to the figures by characters of reference, 1 designates a still of any suitable size and proportions having a convex bottom 2 and an outlet spout 3. This spout, which extends close to the bottom 2 is adapted to be tightly closed by a cap 4 held in place by a screw 5 engaging a spider or cross-bar 6 in the spout.

The unusual outlet flue 7 is extended from the upper portion of the body of the still, and not through the top of the still as is the usual form of construction, and serves to convey turpentine fumes to the usual condensing apparatus.

The top of the still is formed with a flange 8 having slots 9 and this flanged top is adapted to support a removable lid or cover 10 having slots 11 in the margin thereof adapted to register with the slots 9 so that by means of bolts 12 seated in the slots and nuts 13, the cover can be clamped tightly in place so as to seal the top of the still.

At two or more places in the cover there are provided openings 14 surrounded by packing glands 15 and in these openings are slidably mounted rods 16 extending into the still where they are joined to opposed side portions of the open top of a foraminous basket 17. This basket, which is substantially cylindrical, can be formed of a fine mesh wire or screen fabric and the bottom 18 of the basket is hinged, as at 19 and provided with a suitable fastener, such as a spring latch 20. This bottom is preferably concave as shown so that it can fit snugly upon the convex bottom 2 of the still, as shown in Figure 1. If desired the bottom of the basket can be reenforced by a frame 21 shaped to conform to the contour of the bottom of the basket.

A flexible cable 22 is secured to a cross-bar 23 joining the outer or upper ends of rods 16 and is adapted to extend over a pulley 24 on a carriage 25 which can be mounted on a cable or rail 26 so as to travel therealong. A hook 27 or the like is provided on the lid or cover 10 and the cable 22 is adapted to be placed in engagement therewith as shown at 28 after the basket and lid or cover have been raised as shown in Figure 2 so that these parts will thus be supported in raised position and can be moved with the carriage to any point desired.

A filling opening 29 is provided in the lid 10 and is normally closed by a cover 30 detachably fastened in place.

In practice the basket 17 is lowered onto the bottom of the still and the crude gum with commingled trash is delivered into the still through opening 29. The cover 30 is fastened in place and the still is heated. As soon as the gum has melted the basket is raised to the position shown in Figure 2 and secured in place by placing the cable in engagement with the hook 27. This will result in extracting foreign substances from the melted gum so that they will be supported within the top portion of the still. The distilling process is then continued and the turpentine fumes will escape through flue 7. The heat in the still will cause any rosin that is adhering to the foreign substances in the basket 17 to drip down within the still so that ultimately only the objectionable foreign substances will be contained within the basket.

After the distillation has been completed the rosin is withdrawn through spout 3, and the lid 10 is unfastened and is removed with basket 17 and moved to any desired point and emptied as by unfastening the bottom 18 and allowing it to swing down as in Figure 3. The lid 10 can be caused to rest on a bracket 31 during this emptying operation so as to support the basket as in Figure 3. Thereafter the emptied basket is returned to the still, the lid 10 replaced, the still refilled, and the distilling process repeated.

It will be noted, by referring to the drawings, that the basket 17 is of substantially less depth than that of the still. Such a construction is essential in order that the basket may be raised within the still without moving the cover.

By providing the means described for removing the foreign substances from the gum as soon as it is melted, the rosin produced by the distilling process will not become discolored by the chips, bark and straw usually found mixed with the gum and which, if left in the rosin, results in the production of an inferior grade.

What is claimed is:

1. Apparatus for use in the production of rosin and turpentine including a still having a normally closed rosin outlet at the bottom thereof and a vapor outlet adjacent to its top, a removable vapor retaining cover on the still, means for fastening the cover of the still, a foraminous basket removably mounted in the still, said basket being of substantially less depth than that of the still, and means slidable in and held against removal from the cover for raising the basket within the still against the bottom of the cover following the application of heat to the contents of the still and for lifting the cover with the basket.

2. Apparatus for use in the production of rosin and turpentine including a still having a rosin outlet adjacent to the bottom thereof and a vapor outlet adjacent to the top thereof, said rosin outlet being normally closed, a vapor retaining lid normally closing the still at the top thereof, means for fastening the lid to the still, a foraminous basket adapted to be seated on the bottom of the still and to receive gum to be distilled, said basket being of substantially less depth than that of the still, and means extending outside of the still and held against removal from said lid for raising the basket in the closed still and removing the lid from the still.

3. Apparatus for use in the production of rosin and turpentine including a still having a rosin outlet adjacent to the bottom thereof and a vapor outlet adjacent to the top thereof, said rosin outlet being normally closed, a vapor retaining lid normally closing the still at the top thereof, means for fastening the lid to the still, a rod slidable in the lid and held against separation therefrom, a foraminous basket connected to the lower end of the rod and adapted to be seated on the bottom of the still and to contain gum to be distilled, said basket being of substantially less depth than that of the still, and means outside of the still for supporting the rod in position with the basket in the upper portion of the still against the bottom of the lid and for supporting the basket and lid away from the still, said means including a cable connected to the rod, means on the lid for detachable engagement by the cable, and a support for the cable.

4. Apparatus for use in the production of rosin and turpentine including a still having a rosin outlet adjacent to the bottom thereof and a vapor outlet adjacent to the top thereof, said rosin outlet being normally closed, a vapor retaining lid normally closing the still at the top thereof, means for fastening the lid to the still, a rod slidable in the lid and held against separation therefrom, a foraminous basket connected to the lower end of the rod and adapted to be seated on the bottom of the still and to hold gum to be distilled, said basket being of substantially less depth than that of the still, and means outside of the still for supporting the rod in position with the basket in the upper portion of the still and against the lid and for pressing the basket against the bottom of the lid, thereby to elevate and convey the basket and lid relative to the still, said means including a cable connected to the rod, means on the lid for detachable engagement by the cable, a pulley constituting a support for the cable, a carriage supporting the pulley, and a track for the carriage.

5. Apparatus for use in the production of rosin and turpentine including a still having a rosin outlet adjacent to the bottom thereof and a vapor outlet adjacent to the top thereof, said rosin outlet being normally closed, a vapor retaining lid normally closing the still at the top thereof, means for fastening the lid to the still, rods slidable in the lid and held against separation therefrom, a foraminous basket connected to the lower end of the rods and adapted to be seated on the bottom of the still and to contain gum to be distilled, said basket being of substantially less depth than that of the still, and means outside of the still for lifting the rods to elevate the basket against the bottom of the lid and for moving the lid from the still with the basket, said means including a cable connected to the rods, means on the lid for detachable engagement by the cable, and a support for the cable, and a normally closed filling opening in the lid and for supporting the basket and lid away from the still.

6. Apparatus for use in the production of rosin and turpentine including a still having a rosin outlet adjacent to the bottom thereof and a vapor outlet adjacent to the top thereof, said rosin outlet being normally closed, a vapor retaining lid normally closing the still at the top thereof, means for fastening the lid to the still, a foraminous basket adapted to be seated on the bottom of the still and to receive gum to be distilled, said basket being of substantially less depth than that of the still, and means extending outside of the still for raising the basket against the bottom of the lid when unfastened from the still.

LEWIS T. BAKER.